United States Patent
Uchida et al.

(10) Patent No.: US 8,987,970 B2
(45) Date of Patent: Mar. 24, 2015

(54) COIL FIXING MEMBER OF ROTATING ELECTRICAL MACHINE, AND ROTATING ELECTRICAL MACHINE

(75) Inventors: Hirokazu Uchida, Toyota (JP); Taketo Takeuchi, Nishio (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 395 days.

(21) Appl. No.: 13/474,365

(22) Filed: May 17, 2012

(65) Prior Publication Data
US 2012/0293037 A1    Nov. 22, 2012

(30) Foreign Application Priority Data
May 18, 2011 (JP) .................................. 2011-111198

(51) Int. Cl.
*H02K 3/48* (2006.01)
*H02K 3/487* (2006.01)

(52) U.S. Cl.
CPC ...................................... *H02K 3/487* (2013.01)
USPC ........................................................ 310/214

(58) Field of Classification Search
CPC .................................. H02K 3/48; H02K 3/487
USPC .................................................. 310/214, 215
See application file for complete search history.

(56) References Cited

U.S. PATENT DOCUMENTS

| | | | |
|---|---|---|---|
| 4,602,180 A * | 7/1986 | Olson | 310/215 |
| 5,598,049 A * | 1/1997 | Meier | 310/214 |
| 6,713,928 B2 | 3/2004 | Takizawa et al. | |
| 2002/0047456 A1* | 4/2002 | Murayama et al. | 310/214 |
| 2002/0074871 A1* | 6/2002 | Kikuchi et al. | 310/214 |
| 2002/0074889 A1* | 6/2002 | Kikuchi et al. | 310/214 |
| 2005/0200212 A1* | 9/2005 | Lima | 310/59 |
| 2009/0085421 A1* | 4/2009 | Saito et al. | 310/214 |
| 2010/0019626 A1* | 1/2010 | Stout et al. | 310/214 |

FOREIGN PATENT DOCUMENTS

| | | |
|---|---|---|
| JP | 2001211587 A | 8/2001 |
| JP | 2002-354731 A | 12/2002 |
| JP | 2009-011063 A | 1/2009 |
| JP | 2011166859 A | 8/2011 |

* cited by examiner

*Primary Examiner* — Michael Andrews
(74) *Attorney, Agent, or Firm* — Gifford, Krass, Sprinkle, Anderson & Citkowski, P.C.

(57) ABSTRACT

A coil fixing member of a rotating electrical machine, wherein the rotating electrical machine includes a ring-shaped stator core, a slot formed at inner peripheral section of the stator core, a coil arranged in the slot, and wall sections defining opening on an inner periphery of the slot in a radial direction of the stator core, and wherein the coil fixing member is inserted into the slot, the coil fixing member comprising: a pressing section that presses the coil outward in the radial direction of the stator core; and engaging sections that are adjacent to both end sections of the pressing section in a peripheral direction of the stator core, that extend from the both end sections to an inward side in the radial direction of the stator core, and that include leading end sections respectively engaged with the wall sections.

13 Claims, 12 Drawing Sheets

COIL FIXING MEMBER OF ROTATING ELECTRICAL MACHINE, AND ROTATING ELECTRICAL MACHINE

CROSS REFERENCE TO RELATED APPLICATIONS

This application claims priority to Japanese Patent Application No. 2011-111198 filed on May 18, 2011, which is incorporated herein by reference in its entirety including the specification, drawings and abstract.

BACKGROUND OF THE INVENTION

1. Field of the Invention

The invention relates to a coil fixing member of a rotating electrical machine, being a fixing member for fixing a coil that is disposed in a slot of a stator core, and to a rotating electrical machine that uses the coil fixing member.

2. Description of Related Art Japanese Patent Application Publication No. 2009-11063 (JP 2009-11063 A) discloses a stator of a rotating electrical machine. Coils that have rectangular wires are arrayed in a row and inserted into slots of the stator. Thereafter, wedges that are made up of an insulating resin or the like are inserted, along the axial direction, into openings of the slots, on the inward side in the radial direction. The slots are sealed by these wedges.

Japanese Patent Application Publication No. 2002-354731 (JP 2002-354731 A) discloses an alternator for vehicles. The alternator for vehicles has a rotor fixed to a shaft that is rotatably supported on a case, and a hollow-cylindrical stator iron core that is supported on the case, in such a way so as to enclose the rotor. The stator is configured by installing conductor wires on the stator iron core. The stator iron core has slots that extend in the axial direction. Two slots are provided for each phase and for each pole. The slots are side by side in a peripheral direction of the stator iron core. The conductor wires have a circular cross section and having an insulating coating. A radial dimension (d) of conductor wires and a circumferential dimension (L) of the slots obey a relationship 2d<L. In this alternator for vehicles, conductor wires having a circular cross section are fitted into the slots through an opening on the inward side in the radial direction. Wedges are fitted into respective slot openings. The wedges have a solid cylindrical shape, a hollow cylindrical shape, or a substantially cylindrical shape having a cutout, and are capable of deforming elastically.

In some instances, coils are wound on the stator in such a manner that coil end sections, which protrude from an end surface of the stator core in the axial direction, bulge toward the inner periphery of the stator core. In this case, it is difficult to insert the wedges into the slots along the axial direction, as disclosed in JP 2009-11063 A.

The deformable solid-cylindrical or hollow-cylindrical wedges disclosed in JP 2002-354731 A, by contrast, can be inserted into the slots through openings on the inward side in the radial direction. The outer periphery of the circular wedges abuts against, or engages with, protrusions on the inner periphery of the slots. As a result, it may be not possible to secure sufficient fixing force of the wedges against the slots. The above problem becomes particularly manifest when the coil wires that are inserted and disposed in the slots are rectangular wires having a comparatively large cross-sectional area. In such a case, there increases a force (spring-back force) that urges, inward in the radial direction, the coil wires in the slots, under the influence, for instance, of bending deformation of the coil end sections. As a result, the force that pushes the coil wires outward in the radial direction may become insufficient in such an instance. In consequence, coil wires may be disposed at positions, on the inward side in the radial direction, at which copper eddy-current loss is likely to occur on account of magnetic flux linkage from the rotor. The output efficiency of the rotating electrical machine may drop as a result.

SUMMARY OF THE INVENTION

The invention provides a coil fixing member, and a rotating electrical machine, that afford enhanced output efficiency of a rotating electrical machine, through reduction of copper eddy-current loss in coils that are disposed in slots.

A coil fixing member of a rotating electrical machine according to a first aspect of the invention, wherein the rotating electrical machine includes a ring-shaped stator core, a slot formed at inner peripheral section of the stator core, a coil arranged in the slot, and wall sections defining opening on an inner periphery of the slot in a radial direction of the stator core, and wherein the coil fixing member is inserted into the slot, the coil fixing member comprising: a pressing section that presses the coil outward in the radial direction of the stator core; and engaging sections that are adjacent to both end sections of the pressing section in a peripheral direction of the stator core, that extend from the both end sections to an inward side in the radial direction of the stator core, and that include leading end sections respectively engaged with the wall sections.

A rotating electrical machine according to a second aspect of the invention has the following constituent features: a rotor; and a ring-shaped stator disposed around the rotor wherein the stator includes slots extend in a radial direction of the stator, a stator core in which the slots formed at intervals in a peripheral direction of the stator, insulating paper that is inserted into the slots coils that are disposed in the slots so as to be insulated from the stator core by the insulating paper, and the coil fixing member according to the first aspect.

In the first aspect or second aspect of the invention, the leading end sections of the engaging sections, on the both sides of the pressing section, are engaged with the wall sections, on the inward side in the radial direction of the stator core. Therefore, the engaging sections support the pressing section to press the coil outward in the radial direction of the stator core. The supporting force of the engaging sections causes a large pressing force to act on the coil in the slot. As a result, the coil is disposed tightly in the slot, and is firmly fixed in the stator core.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention are explained below with reference to accompanying drawings. In the explanation below, specific configurations, materials, numerical values, directions and so forth are merely examples for facilitating comprehension of the invention, and may be appropriately modified depending on the intended application, purpose, specifications and the like.

Figure 1:
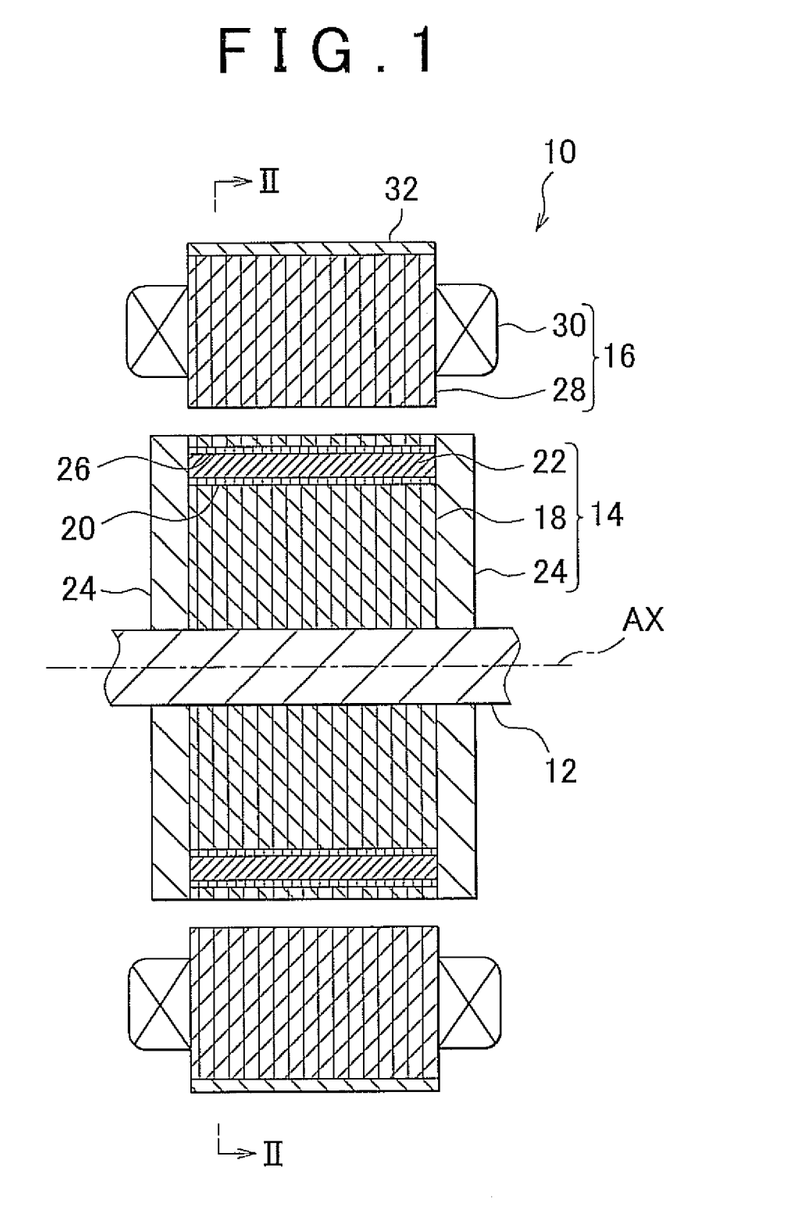
FIG. 1 is a cross-sectional diagram, in the axial direction, of a rotating electrical machine in an embodiment of the invention.

FIG. 1 is a side cross-sectional diagram of a rotating electrical machine 10 according to one embodiment of the invention. As illustrated in FIG. 1, the rotating electrical machine 10 is provided with a rotor 14 that is fixed to a rotating shaft 12 that is disposed so as to be rotatable about a rotation center axis AX; and with a ring-shaped stator 16 that is disposed around the rotor 14.

The rotor 14 is provided with: a rotor core 18 formed a stack of a plurality of magnetic steel sheets; a plurality of permanent magnets 22, formed at an outer edge side of the rotor core 18, and that are inserted into permanent magnet insertion holes 20 that extend in the direction of the rotation center axis AX; and end plates 24 that clamp the rotor core 18 from both sides in the axial direction. The permanent magnets 22 are fixed in the permanent magnet insertion holes 20 by a resin 26.

The stator 16 is provided with a stator core 28 that is shaped in the form of a ring so as to surround the periphery of the rotor 14, and with coils 30 that are fitted onto the stator core 28. The stator core 28 is fixed to the inner peripheral face of a cylindrical case 32.

Figure 2:
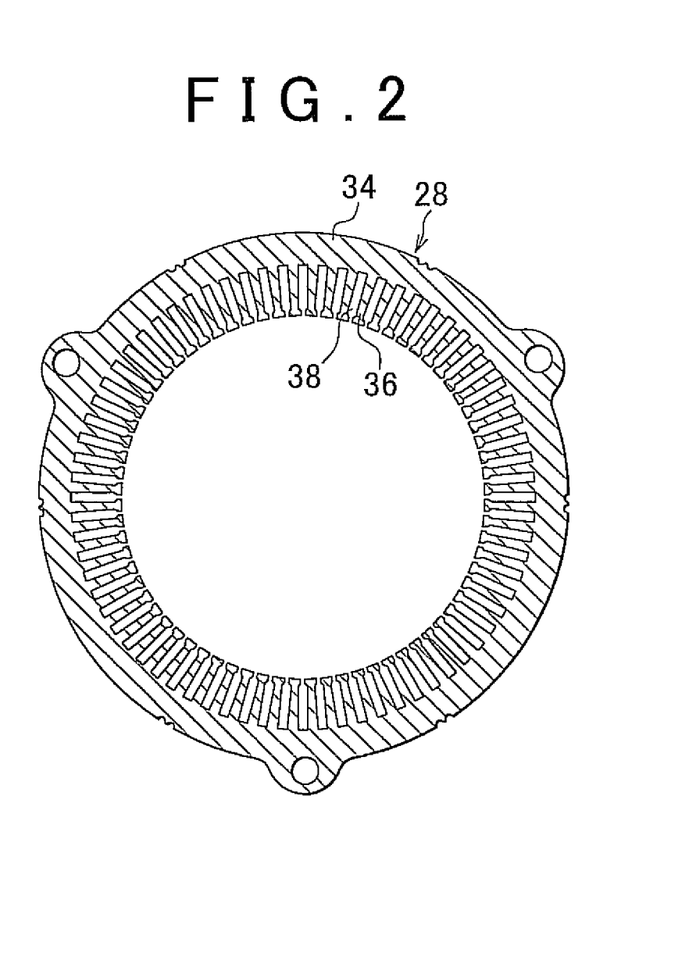
FIG. 2 is a cross-sectional diagram of a stator core along line II-II in FIG. 1.

FIG. 2 is a cross-sectional diagram of the stator core 28 along line in FIG. 1. As illustrated in FIG. 2, the stator core 28 is provided with a ring-shaped yoke section 34 that extends in the peripheral direction of the stator core 28, and with teeth 36 that protrude, from the inner peripheral face of the yoke section 34, inward in the radial direction, toward the rotor 14, and that are provided at intervals in the peripheral direction. Slots 38 that extend in the radial direction of the stator core 28 are formed between respective teeth 36. The slots 38 as well are formed extending in the radial direction of the stator core 28 and are disposed at intervals in the peripheral direction.

Figure 3:
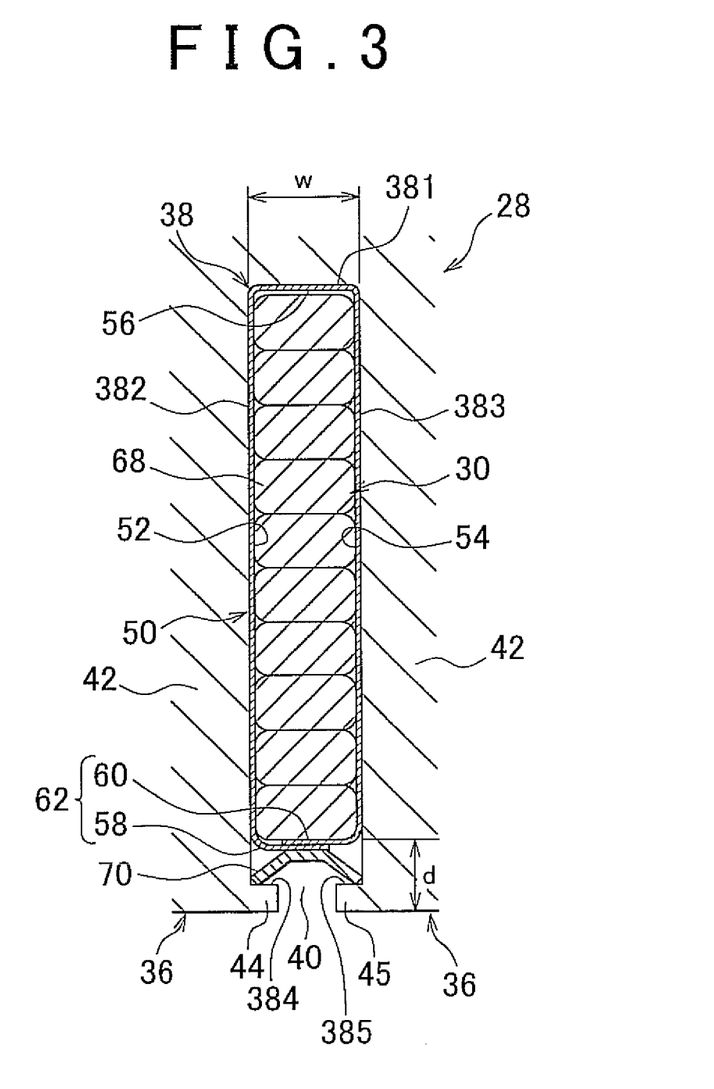
FIG. 3 is a cross-sectional diagram illustrating an enlargement of one of the slots in FIG. 2.

FIG. 3 is a cross-sectional diagram illustrating an enlargement of one of the slots 38 of FIG. 2. Each slot 38 is opened toward the inner peripheral face of the stator core 28. An opening 40 of the slot 38 on the inward side in the radial direction is defined by the end faces, on the inward side in the radial direction, of teeth 36 that are adjacent to each other in the peripheral direction.

The teeth 36 are provided each with a main body section 42 that protrudes, from the inner peripheral face of the yoke section 34, in the radial direction of the stator core 28, and with overhang sections 44, 45 that are formed at end sections of each main body section 42, on the inward side in the radial direction, and that overhang in the peripheral direction of the stator core 28. Accordingly, the opening 40 on the inward side in the radial direction is defined between the overhang sections 44, 45 on both sides. A width w of the slot 38, on the outward side from the opening 40 in the radial direction, is narrower than a width of the opening 40. The slot 38 is formed to have a constant peripheral-direction width w over the entire the radial direction, except at the opening 40.

The inner surface of the slot 38 includes a inner peripheral face 381, side wall faces 382, 383 and front wall faces 384, 385. The inner peripheral face 381 is positioned on the outermost side, in the radial direction. The side wall face 382 is adjacent to the inner peripheral face 381 and is defined by the side face of a main body section 42 of one of the teeth 36. The side wall face 383 opposes the side wall face 382, across the peripheral direction. The front wall face 384 is adjacent to the side wall face 382, on the inward side in the radial direction. The front wall face 385 is adjacent to the side wall face 383, on the inward side in the radial direction. Herein, the front wall face 384 is defined by the rear face of the overhang section 44, and the front wall face 385 is defined by the rear face of the overhang section 45. The front wall faces 384, 385 serve as wall sections on the inward side in the radial direction, that define an opening of the slot on an inner periphery.

Insulating paper 50 is inserted into the slot 38 along the inner surface of the slot 38. The insulating paper 50 is made up of side face insulating sections 52, 54, an outer peripheral insulating section 56 and bent sections 58, 60. The side face insulating section 52 extends along the side wall face 382. The side face insulating section 54 extends along the side wall face 383. The outer peripheral insulating section 56 connects an end section of the side face insulating section 52, on the outward side in the radial direction, with an end section of the side face insulating section 54, on the outward side in the radial direction. The bent section 58 is formed at an end section of the side face insulating section 52, on the inward side in the radial direction, and is bent toward the side face insulating section 54. The bent section 60 is formed at the other end section of the side face insulating section 54, and is bent toward the side face insulating section 52.

The length of the side face insulating section 54 in the longitudinal direction (i.e., radial direction of the stator core) is shorter than the length of the side face insulating section 52 in the longitudinal direction. As a result, the leading end section of the bent section 60 that is formed at the end section of the side face insulating section 54 extends toward the rear face side of the bent section 58 (side face on the inward side of the slot 38). An overlap section 62, in which the bent sections 58, 60 are overlapped with each other, is formed. Thus, the inward side of the insulating paper 50 in the radial direction is closed.

One of the coils 30 is inserted into the slot 38 into which the insulating paper 50 is inserted. The insulating paper 50 is wrapped around the periphery of the coil 30. The coil 30 is disposed thereby in an insulted state from the stator core 28. Coil 30 is formed of coil wires 68. The coil wire 68 is a rectangular wire having a substantially quadrangular cross section. Therefore, a plurality (ten, in the present embodiment) of coil wires 68 is disposed side by side within one slot 38.

Rectangular wires having a rectangular cross section are used in the coil wires 68 of the present embodiment, but there may be used rectangular wires having a substantially square cross section. The width of the coil wires 68 in the peripheral direction is set to be slightly smaller than a value resulting from subtracting the thickness of the side face insulating sections 52, 54 from the slot width w. Thus, the coil wires 68 can be inserted in such a way so as not to come into contact with the inner face of the insulating paper 50 when the coil wires 68 are inserted, in the axial direction, into the insulating paper 50 that is disposed in the slot 38. The coil wires 68 that are disposed in the slot 38 are pressed, by a below-described wedge member 70, outward in the radial direction; thereby, the plurality of coil wires 68 is closely contacted each other without gaps in between. Herein, a distance d established beforehand is secured between the side face, on the inward side in the radial direction, of the coil wire 68 that is positioned at the innermost periphery, and the end face of the teeth 36, on the inward side in the radial direction. The dimensions of the slot 38, the insulating paper 50 and the wedge member 70 are set in such a way so as to secure this distance d.

The rotating electrical machine 10 according to the present embodiment is fed with three-phase alternating current (AC) power. The coils 30 include U phase coils, V phase coils and W phase coils. For instance, forty-eight slots 38 are arranged in the peripheral direction. The U phase coils are accommodated in sixteen slots among the forty-eight slots 38, respectively. The V phase coils are accommodated in other sixteen slots among the forty-eight slots 38, respectively. The W phase coils are accommodated in other sixteen slots among the forty-eight slots 38, respectively. In this case, the three phase coils may be accommodated in order of the U phase coil, the V phase coil, and the W phase coil, along the peripheral direction. Alternatively, the three phase coils may be arranged sequentially in the peripheral direction in such a manner that same-phase coils are inserted into two adjacent slots 38. For example, the three phase coils may be accommodated in order of the U phase coil, the U phase coil, the V phase coil, the V phase coil, the W phase coil, and the W phase coil, along the peripheral direction.

Figure 4:
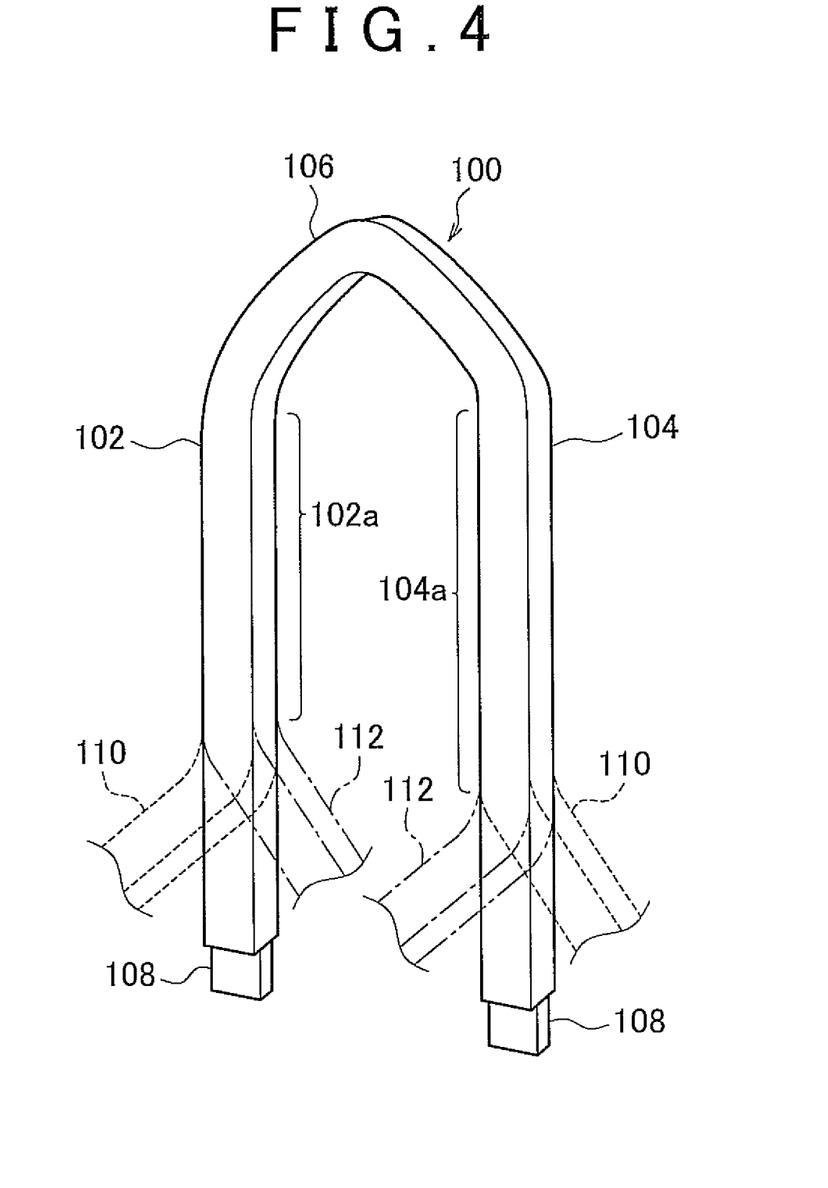
FIG. 4 is a perspective-view diagram of one conductor segment that constitutes coil wires that form a coil.

FIG. 4 is a perspective-view diagram illustrating a conductor segment 100 that constitutes the coil wires 68 that form the coil 30. The conductor segment 100 is a rectangular wire having a rectangular cross-section. The conductor segment 100 is bent to have a U shape. The conductor segment 100 has two leg sections 102, 104 and a curved section 106. The leg sections 102, 104 extend parallel to each other. The curved section 106 is adjacent to each end section of the leg sections 102, 104. The other end sections of the leg sections 102, 104 have the insulating cover thereof removed to expose, for instance, copper-made core materials 108. Intermediate portions 102a, 104a of the leg sections 102, 104 constitute the coil wires 68 that are disposed in the slots 38.

As described above, the insulating papers 50 are inserted into the slots 38. The leg section 102 is inserted, from one end of the stator core 28, into an inward of the one insulating paper 50. The leg section 104 is inserted into an inward of the other insulating paper 50, which is spaced apart from the one insulating paper 50, in the peripheral direction. A plurality of conductor segments 100 is arrayed, in the radial direction, through sequential insertion into the two slots 38 in the same way as described above. As a result, the coil wires 68 are inserted, aligned with each other, in the slots 38. The leading end portions of each of the leg sections 102, 104 protrude from the other end face of the stator core 28 in the axial direction.

The leading end portions of the leg sections 102, 104, which protrude from the other end face of the stator core 28 in the axial direction, are bent outward, as denoted by the broken line 110 in FIG. 4. Then, core materials 108 of the leg sections 102, 104 are connected to leg sections 102, 104 of other conductor segments 100 of the same-phase coils that are adjacent in the peripheral direction through welding. Alternatively, the leading end portions of the leg sections 102, 104 may be bent inward, as denoted by the chain line 112 of FIG. 4. In this case, the core materials 108 may be connected to other conductor segments 100 that are adjacent outward and inward in the peripheral direction through welding. In the other variation, one leg section 102 may be bent outward, and the other leg section 104 may be bent inward. In this case, the core materials 108 may be connected to other conductor segments 100 that are adjacent in the peripheral direction or the radial direction through welding.

The conductor segments 100 thus disposed in the slots 38 are sequentially connected electrically to each other, to configure thereby U phase coils, V phase coils and W phase coils. One end section of each coil of each phase is connected to a respective input terminal of three-phase AC power of the rotating electrical machine 10, and the other end section of each coil of each phase is connected to a common neutral point.

Figure 5:
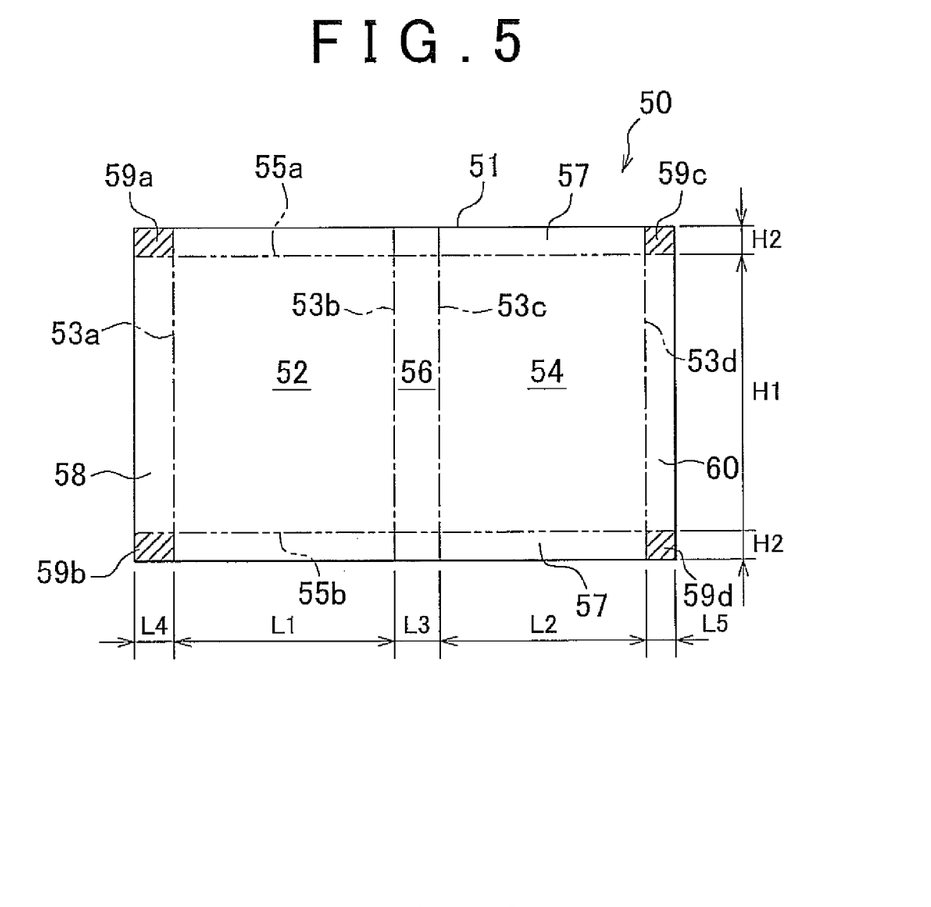
FIG. 5 is an unfolded plan-view diagram of insulating paper.

FIG. 5 is an unfolded perspective-view diagram of the insulating paper 50 before insertion into the slots 38. The insulating paper 50 is configured through folding of one substantially rectangular insulating sheet 51.

The insulating sheet 51 has four inward fold lines 53a, 53b, 53c, 53d that are parallel to a short-side direction. The insulating sheet 51 is inward-folded along the inward fold lines 53a, 53b, 53c, 53d. As a result, a flat tubular insulating paper 50 is formed that has an inner space shaped substantially as a parallelepiped, as illustrated in FIG. 6.

The region between the inward fold lines 53a, 53b is a portion that constitutes the side face insulating section 52. The region between the inward fold lines 53c, 53d is a portion that constitutes the side face insulating section 54. The region between the inward fold lines 53b, 53c is a portion that constitutes the outer peripheral insulating section 56. The end section outward of the inward fold line 53a is a portion that constitutes the bent section 58. The end section outward of the inward fold line 53d is a portion that constitutes the bent section 60.

Figure 6:
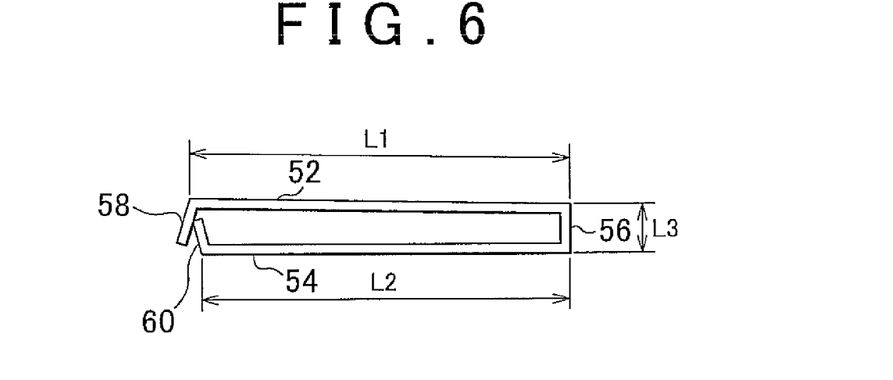
FIG. 6 is a side-view diagram illustrating a folded state of insulating paper before slot insertion.

As illustrated in FIGS. 5 and 6, a length L2 of the side face insulating section 54 in the longitudinal direction is shorter than a length L1 of the side face insulating section 52 in the longitudinal direction. Upon formation of the insulating paper 50 through folding of the insulating sheet 51, therefore, the bent section 58 adjacent to the side face insulating section 52 is reliably disposed outward of the bent section 60 that is adjacent to the side face insulating section 54. Furthermore, the bent sections 58, 60 are overlapped uniformly across the slots 38. That is, the overlapping state of the overlap section 62 is uniform across the slots 38.

A length or width L4 of the bent section 58 is longer than a length or width L5 of the bent section 60. As a result, the bent section 58 overlaps reliably outward the bent section 60 upon formation of the insulating paper 50 through folding of the insulating sheet 51.

A length L3 between the inward fold lines 53b, 53c is set to be slightly shorter than the width w of the slot 38. In this embodiment, the width of the outer peripheral insulating section 56 of the insulating paper 50 is made slightly smaller than the opening width w of the slot 38. As a result, this allows facilitating the operation of inserting the insulating paper 50 through the axial-direction opening of the slot 38.

The insulating paper 50 includes a foam layer, as described below. The foam layer expands in a heating treatment. Accordingly, even though the width of the outer peripheral insulating section 56 is set to be smaller than the width w of the slot 38, the space between the insulating paper 50 and the stator core 28 is filled up, leaving no gaps in between.

As illustrated in FIG. 5, the insulating sheet 51 further has two outward fold lines 55a, 55b that are parallel to a long-side direction. Fold-back sections 57 are formed in the axial-direction end section of the insulating paper 50 through outward folding of the insulating sheet 51 along the outward fold lines 55a, 55b. The function of the fold-back sections 57 is described further on.

Figure 7:
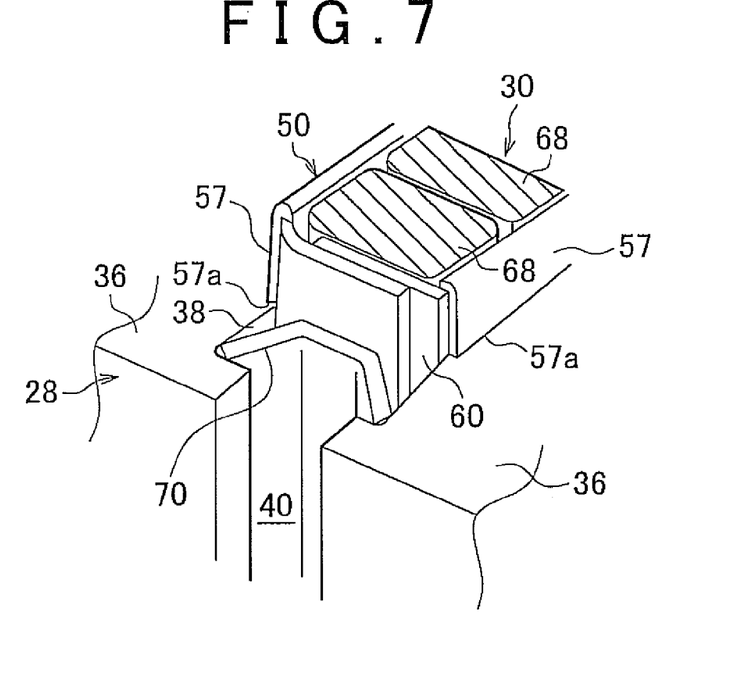
FIG. 7 is a partial enlarged perspective-view diagram illustrating insulating paper, a coil and a wedge member disposed in a slot.

Herein, H1 denotes the length of the insulating sheet 51, in the vertical direction (corresponding to the axial direction), excluding the fold-back sections 57. The value resulting from subtracting the width of the fold-back sections 57 on both sides (2×H2) from the length H1 is set to be substantially identical to the axial-direction length of the stator core 28. As illustrated in FIG. 7, leading end sections 57a of the fold-back sections 57 are formed at both ends of the insulating paper 50. As a result, the leading end sections 57a abut both end faces, in the axial direction, of the stator core 28, when the folded-back insulating paper 50 is inserted into the slot 38. More specifically, the leading end sections 57a abut respective end faces, on both sides in the axial direction, of the main body sections 42 of the teeth 36.

Four corners 59a, 59b, 59c, 59d, which are hatched quadrangular portions of the insulating sheet 51 in FIG. 5, are cut off beforehand. As a result, no fold-back sections are formed at the portions where the bent sections 58, 60 protrude outward, in the axial direction, from the slot 38, when the insulating paper 50 is disposed in the slot 38, as illustrated in FIG. 7.

The insulating sheet 51, however, is not limited thereto, and the four corners 59a, 59b, 59c, 59d need not be cut off. In such a case, the insulating sheet 51 is used in its original rectangular shape, and fold-back sections are formed also at the bent sections 58, 60.

Figure 8:
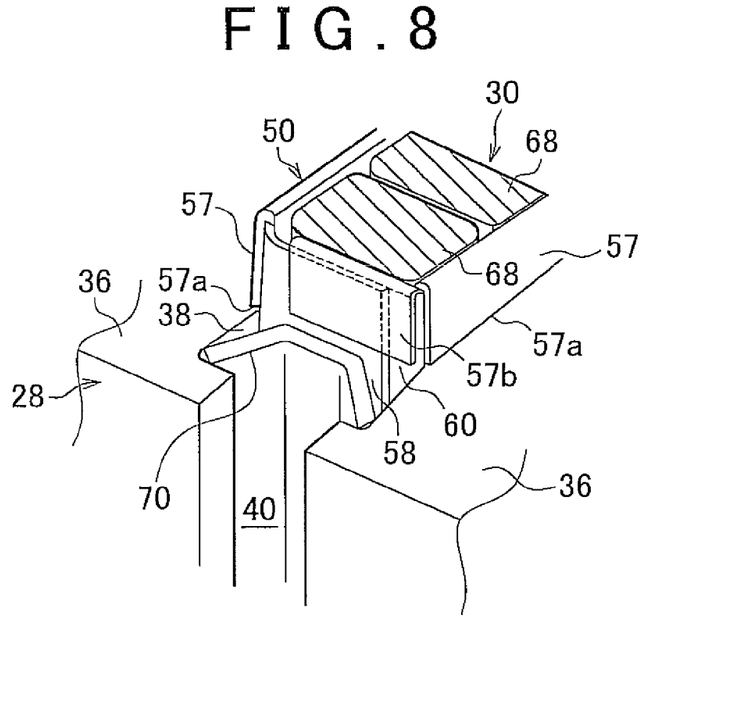
FIG. 8 is a diagram, identical to that of FIG. 7, illustrating a variation of the insulating paper.

Alternatively, two corners 59a, 59b that are contiguous to the bent section 58 may be cut off, while two corners 59c, 59d that are contiguous to the bent section 60 may not be cut off. In this case, two slits, of which lengths are H2, are made on the inward fold line 53d. In this case, a fold-back section 57b is formed at the axial-direction end section of the bent section 60, as illustrated in FIG. 8. The fold back section 57b pushes against the surface of the inner periphery of the bent section 58. This facilitates formation of the overlap section 62 of the bent sections 58, 60. As a result, the insulating paper 50 is inserted into the slot 38 while the bent sections 58, 60 are kept overlapping each other. This prevents interference between the coil wires 68 and the insulating paper 50, during coil insertion, through jutting of the bent sections 58, 60 into the slot.

With reference to FIG. 3, a wedge member 70 having a mountain shape is fitted into the innermost periphery in the slot 38. The wedge member 70 presses the coil wires 68 outward in the radial direction, via the overlap section 62 of the insulating paper 50. Thus, the wedge member 70 functions as a coil fixing member for fixing the coil 30 to the stator core 28. The wedge member 70 functions also as a holding member that pushes the bent sections 58, 60 of the insulating paper 50, disposed in the slot 38, toward the back of the slot, i.e., outward in the radial direction. The bent section 58 is kept overlapping the bent section 60. Thus, the insulating paper 50 is closed by the bent section 58, 60.

Figure 9:
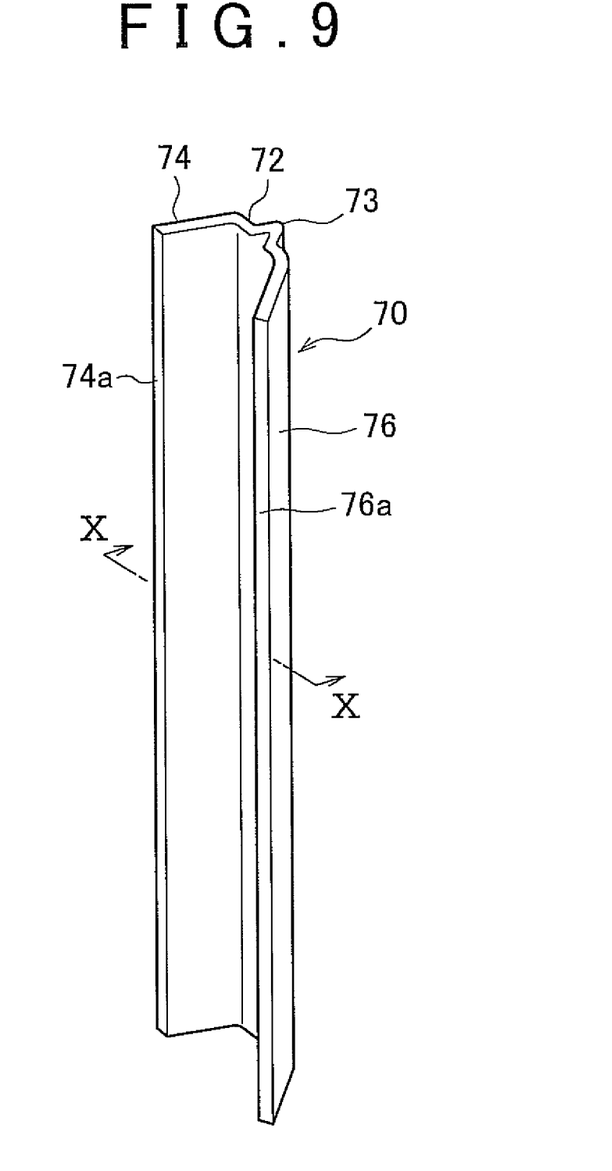
FIG. 9 is an enlarged perspective-view diagram of a wedge member.
Figure 10:
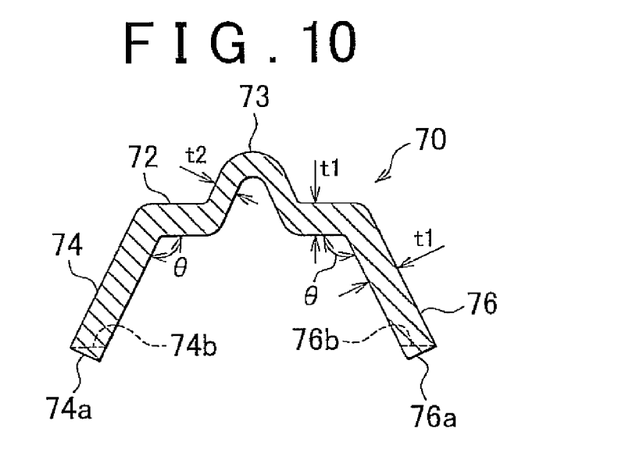
FIG. 10 is a cross-sectional diagram along line X-X in FIG. 9.

FIG. 9 is an enlarged perspective-view diagram illustrating the wedge member 70. FIG. 10 is a cross-sectional diagram along line X-X in FIG. 9. In broad terms, the wedge member 70 has a substantially U-shaped or substantially trapezoidal end face and cross section. A length of the wedge member 70 is substantially identical to the total length, in the axial direction, of the stator core 28, i.e., the axial-direction length of the slot 38. Thus, the wedge member 70 extends over the entire length of the slot 38.

The wedge member 70 may be formed, for instance, as one single member of insulating resin, such as polyether imide or the like. The wedge member 70 has a flat section 72, and engaging sections 74, 76. The flat section 72 is formed substantially along the side face of the coil wire 68 that is positioned at the innermost periphery in the slot 38 when disposed in the slot 38. The flat section 72 includes both ends in the peripheral direction of the stator core 28. The engaging sections 74, 76 are adjacent to the both ends of the flat section 72 and extend from the both ends to an inward side in the radial direction of the stator core 28. A protrusion (elastic deformation section) 73, curved convexly inward in the radial direction (upwards in FIG. 10) is formed at an intermediate position of the wedge member 70.

Herein, the flat section 72 and the protrusion 73 in the wedge member 70 function as a pressing section that presses the coil wires 68 outward in the radial direction. Leading end sections 74a, 76a of the engaging sections 74, 76 are engaged with the front wall faces 384, 385 of the slot 38 upon complete insertion of the wedge member 70 into the slot 38. The engaging sections 74, 76 are disposed to extend from the coil wires 68 to the front wall faces 384, 385, so as to support the flat section 72 and the protrusion 73 to press the coil wires 68 outward in the radial direction. As a result, the flat section 72 and the protrusion 73 support the coil wires 68 in a state where the latter are pressed outward in the radial direction.

The wedge member 70 is bent outward at the both ends of the flat section 72. Thus, the engaging sections 74, 76 in the wedge member 70 are formed at the both sides of the flat section 72. Herein, an inner angle θ that is formed by the flat section 72 and each locking section 74, 76, upon engaging of the engaging sections 74, 76 to the slot 38, may be set to range, for instance, from 90 degrees to 135 degrees. The supporting force of the engaging sections 74, 76, in the surface direction, acts effectively, as a result, as a pressing force of the coil wires 68. A substantial coil fixing force can be thus achieved. In the present embodiment, the engaging sections 74, 76 of the wedge member 70 are formed as symmetrical shapes with respect to a straight line that runs through the center of the protrusion 73. However, the embodiment is not limited thereto, and the engaging sections 74, 76 may be formed as non-symmetrical shapes. For instance, the lengths of the overhang sections 44, 45 in the peripheral direction may differ from each other and the folding angles of the engaging sections 74, 76 with respect to the flat section 72 may accordingly differ from each other.

As indicated by the broken line in FIG. 10, leading end faces 74b, 76b of the engaging sections 74, 76 in the wedge member 70 may be substantially parallel to the flat section 72.

In such a configuration, the leading end faces 74*b*, 76*b* abut the front wall faces 384, 385 of the slot 38 when the wedge member 70 is fitted into the slot 38. The engaging state of the engaging sections 74, 76, and accordingly the fixing state of the wedge member 70, becomes more stable as a result.

Further, a thickness of the flat section 72 in the wedge member 70 in the present embodiment is defined as t1. The thickness of the flat section 72 is identical to that of engaging sections 74, 76. By contrast, a thickness t2 of the protrusion 73 is smaller than the thickness t1 of the flat section 72. As a result, the protrusion 73 undergoes readily elastic deformation when the wedge member 70 is inserted through the opening 40 of the slot 38. This facilitates the insertion operation of the wedge member 70.

Figure 11:
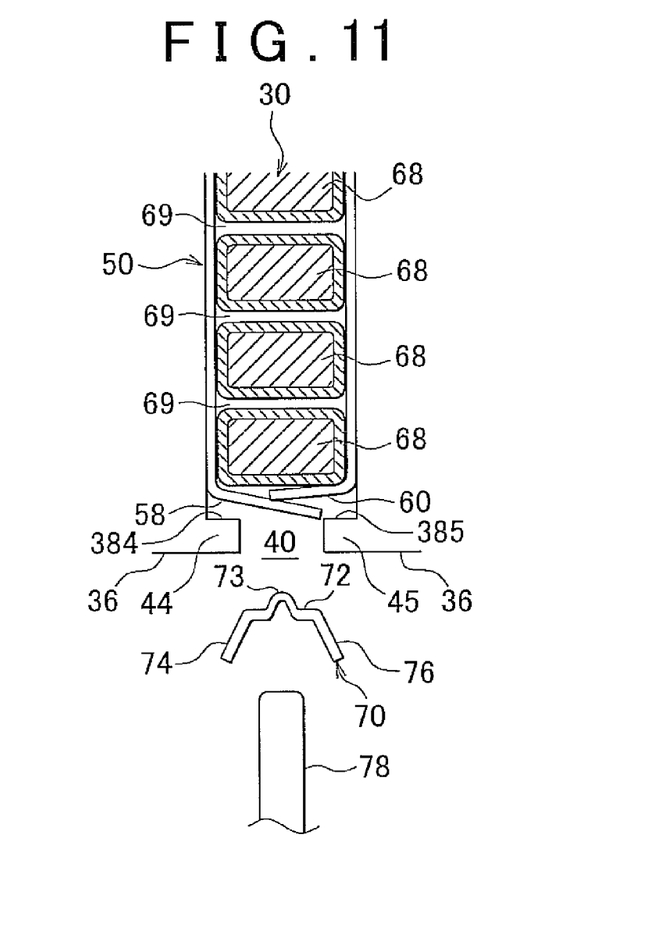
FIG. 11 is a diagram illustrating the manner in which a wedge member is inserted into a slot.

The wedge member 70 as described above is inserted into to the slot 38 in the following manner. As illustrated in FIG. 11, the wedge member 70 is provided facing the opening 40 of the slot 38. Furthermore, the wedge member 70 is pushed into the opening 40, from inward in the radial direction, by a pushing jig 78. Herein, a leading end face of the pushing jig 78 pushes the wedge member 70 by coming into contact with the protrusion 73.

At this time there may be gaps 69 formed between the plurality of coil wires 68 that are inserted inward of the insulating paper 50 that is already disposed in the slot 38. The gaps 69 arise on account of the spring-back force, of the coil wires 68, that is generated through bending deformation of the leg sections 102, 104 of the conductor segment 100. Alternatively, the gaps 69 may arise, for instance, as a result of manufacturing error of the coil 30 that is formed through connection, by welding or the like, of the conductor segments 100.

Figure 12:
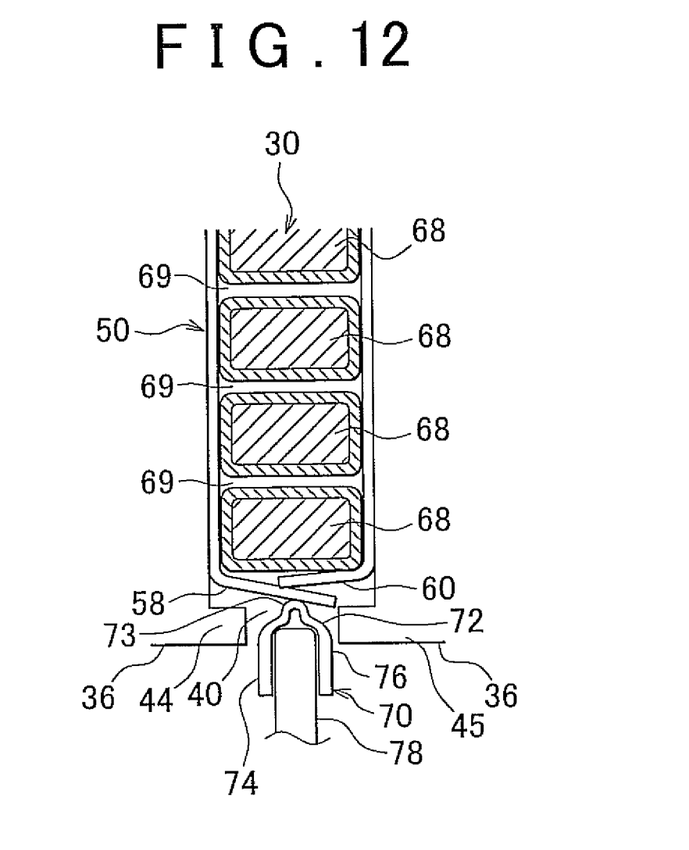
FIG. 12 is a continuing diagram of FIG. 11 illustrating the manner in which a wedge member is inserted into a slot.

As the wedge member 70 passes through opening 40, the outer surface of the wedge member 70 abuts the overhang sections 44, 45, as illustrated in FIG. 12. Thereupon, the protrusion 73 deforms elastically, and becomes narrower in the width in such a manner that the engaging sections 74, 76 draw closer to each other. The wedge member 70 can pass as a result through the opening 40. As described above, elastic deformation occurs at this time mainly in the protrusion 73.

Figure 13:
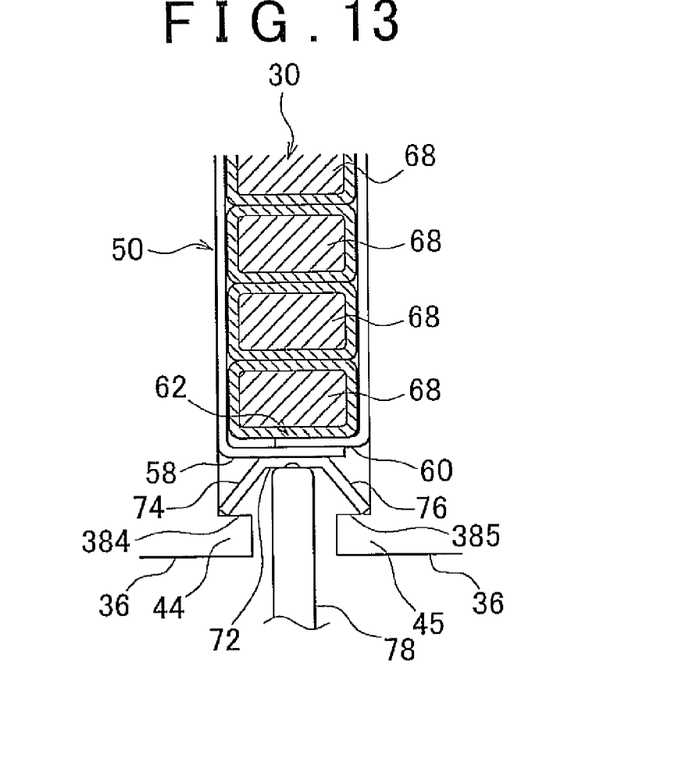
FIG. 13 is a continuing diagram to FIG. 12 illustrating the manner in which a wedge member is inserted into a slot.

The protrusion 73 at the intermediate position of the wedge member 70 that has been pushed into the slot 38 presses the coil wires 68 outward in the radial direction, via the bent sections 58, 60 of the insulating paper 50, on account of the push-in force of the pushing jig 78. As a result, the bent sections 58, 60 of the insulating paper 50 are kept in a state of overlapping each other, as illustrated in FIG. 13. Also, the coil wires 68 are kept closely contacted each other.

At this time, the protrusion 73 is plastically deformed by being squashed. As a result, the contact surface of the flat section 72 and the protrusion 73 against the insulating paper 50 becomes flat. That is, a surface of the protrusion 73 is made flush with a surface of the flat section 72. Therefore, the width of the contact surface of the flat section 72 and of the protrusion 73 expands in the peripheral direction. The combined surface of the flat section 72 and the protrusion 73 thereby presses against the coil wires 68. As a result, a large and stable pressing force acts on the coil wires 68.

The coil wires 68 are pushed and closely contacted each other. At the same time, the engaging sections 74, 76 of the wedge member 70 pass through the opening 40, recover elastically, and spread outward. Thereupon, the leading end sections 74*a*, 76*a* of the engaging sections 74, 76 are engaged with the front wall faces 384, 385 of the slot 38 or the front wall faces 384, 385 and the side wall faces 382, 383. As a result, the wedge member 70 is fixed in the slot 38 and the coil wires 68 are pressed and fixed by the flat section 72 and the protrusion 73 in the slot 38.

The rotating electrical machine 10 of the present embodiment uses the wedge member 70. The leading end sections 74*a*, 76*a* of the engaging sections 74, 76 of the wedge member 70 are engaged with the front wall faces 384, 385 of the slot 38. The wedge member 70 that is inserted into the slot 38 through the opening 40 of the slot 38, inward in the radial direction, is fixed within the slot 38 as a result. The pressing state of the flat section 72 is supported by the engaging sections 74, 76. A significant pressing force is exerted as a result onto the coil wires 68 in the slot 38. Therefore, the coil wires 68 that are disposed in the slot 38 are pressed and fixed against the inner peripheral face 381 of the slot 38, on the outward side in the radial direction, in a state where the coil wires 68 have close contact with each other. The coil 30 is firmly fixed to the stator core 28 as a result.

The leading end sections 74*a*, 76*a* of the engaging sections 74, 76 that point inward in the radial direction are engaged by being caught on the front wall faces 384, 385 of the slot 38. Once the wedge member 70 is fitted as a result into the slot 38, the wedge member 70 is prevented from slipping, out of the opening 40, inward in the radial direction.

In the above configuration, the wedge member 70 disposed in the slot 38 allows securing the distance d (FIG. 3), set beforehand, between the inner peripheral leading end face of the teeth 36 and the coil wire 68 that is positioned at the innermost periphery in the slot 38. The distance d is set beforehand, for instance in such a manner that the coil is fixed at a position where coil copper eddy-current loss, caused by magnetic flux linkage from the rotor 14, is less likely to occur. The output efficiency of the rotating electrical machine 10 is enhanced in such a case.

Figure 14:
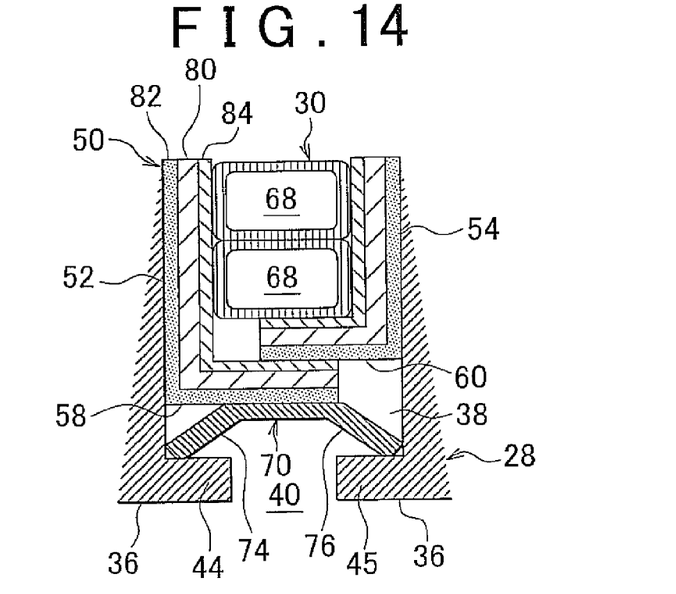
FIG. 14 is a cross-sectional diagram illustrating a layer structure of insulating paper.

The layer structure of the insulating paper 50 will be explained next with reference to FIG. 14. FIG. 14 is a partial enlarged cross-sectional diagram of an innermost peripheral section of the slot 38.

The insulating paper 50 has a three-layer structure resulting from stacking a foam layer 82 on one of the surfaces of a insulating substrate sheet 80, and an adhesive layer 84 on the other surface. In this case, the foam layer 82 is provided on the stator core 28 side and the adhesive layer 84 on the coil 30 side.

A resin film, for instance of polyethylene naphthalate, may be used in the insulating substrate 80. The foam layer 82 may be formed, for instance, out of an epoxy-based foamed resin material. The adhesive layer 84 may be formed, for instance, out of an unsaturated polyester resin material.

The stator core 28 includes the insulating paper 50, the coil 30 and the wedge member 70. The foam layer 82 of the insulating paper 50 expands, in the thickness direction, upon heating of the stator core 28. As a result, the adhesive layer 84 is pressed against the coil 30, and the insulating paper 50 is solidly fixed to the coil 30.

The foam layer 82 exhibits also adhesive performance. Through foaming, therefore, the foam layer 82 itself presses against the inner wall of the slot 38. The foam layer 82 as well is thus solidly fixed to the stator core 28, and as a result, the coil 30 is solidly fixed to the stator core 28, via the insulating paper 50.

The adhesive layer 84 of the bent section 58 is solidly fixed to the bent section 60, as a result of the above-described heating treatment, at the overlap section 62 of the insulating paper 50. The insulating paper 50 can be maintained as a result in a firmly closed state.

Figure 15:
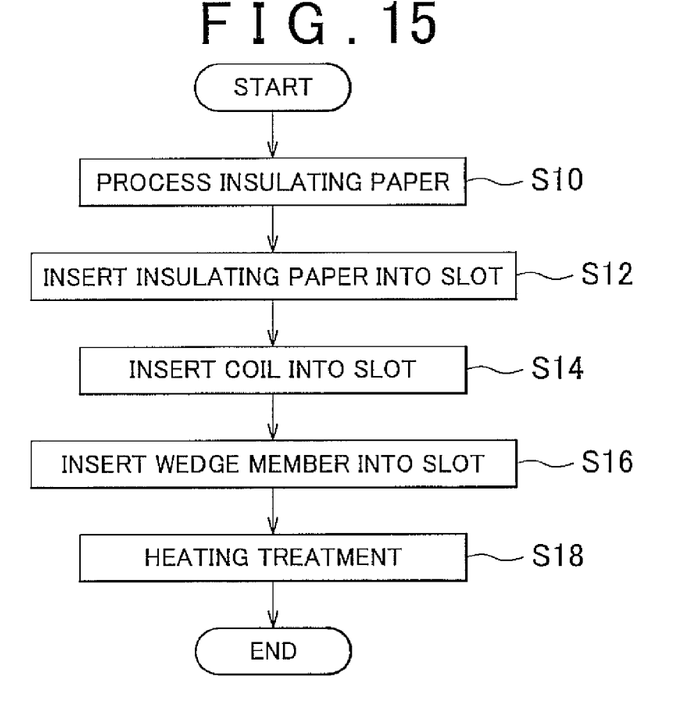
FIG. 15 is a flowchart illustrating a manufacturing sequence of a stator.
Figure 16:
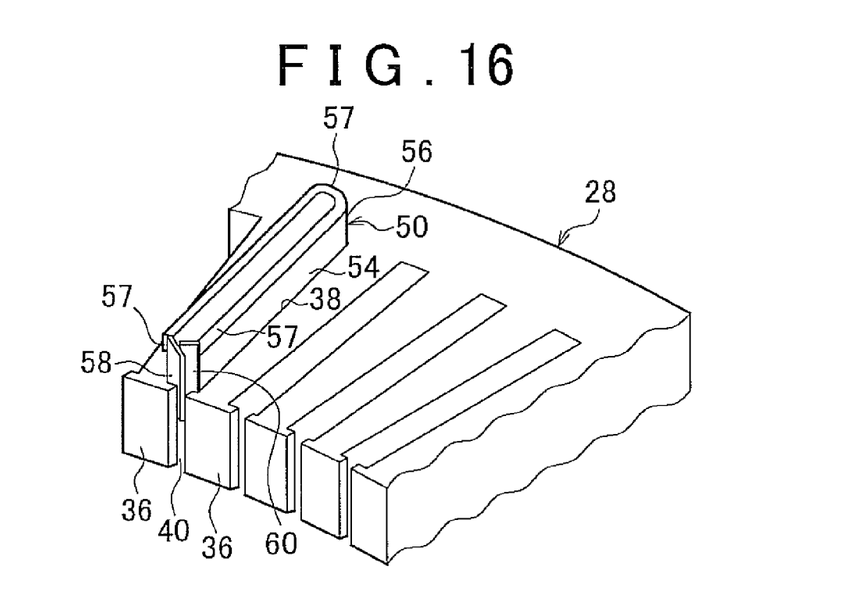
FIG. 16 is a perspective-view diagram illustrating the manner in which insulating paper is inserted into a slot.

A method for manufacturing the stator 16 of the rotating electrical machine 10 is explained next with reference to FIGS. 15 and 16. FIG. 15 is a flowchart illustrating a manufacturing sequence of the stator 16. FIG. 16 is a perspective-view diagram illustrating the manner in which the insulating paper 50 is inserted into the slot 38.

With reference to FIG. 15, firstly the insulating paper 50 is processed in step S10. The insulating sheet 51 is first cut out of a band shaped substrate as described above with reference to FIGS. 5 and 6. Next, the corners 59a to 59d of the insulating sheet 51 are cut off. The insulating sheet 51 is folded then along the inward fold lines 53a to 53d and the outward fold lines 55a, 55b. As a result there is obtained the insulating paper 50 that is folded in the form of a flat rectangular tube.

Next, in step S12, the insulating paper 50 thus processed is inserted into the slot 38, through the axial-direction opening, as illustrated in FIG. 16. Herein, the fold-back sections 57 positioned at the insertion front end side are in a state of being pressed against the side face insulating sections 52, 54. Therefore, the insulating paper 50 is inserted while sliding against the side wall faces 382, 383 of slot 38. Hampering of the insertion operation of the insulating paper 50 is prevented as a result.

Then, as illustrated in FIG. 7, the leading end sections 57a of the fold-back sections 57 abuts one end faces of the teeth 36 in the axial direction. The leading end sections 57a are positioned at the insertion rear end side. The insertion of the insulating paper 50 is completed upon the abutment. The axial-direction position of the insulating paper 50 is determined thereby. Herein, the fold-back sections 57 positioned at the insertion front end side spread slightly out on account of the elastic force of the insulating sheet 51 upon passing through the slot 38. As a result, the leading end sections 57a of the fold-back sections 57 that are positioned at the insertion front end side abut against, or engage with, other end faces of the teeth 36 in the axial direction. This restricts the motion of the insulating paper 50 in a direction opposite to the insertion direction. The axial-direction position of the insulating paper 50 with respect to the stator core 28 is substantially determined as a result. Shifting of the insulating paper 50 in the axial direction is suppressed thereby regardless of the coil insertion direction.

In the present embodiment, the fold-back sections 57 are provided at both ends of the insulating paper 50, but the embodiment is not limited thereto. The fold-back sections 57 may be provided just at the end section of the insulating paper 50, on the rear end side in the coil insertion direction. This allows, as a result, reducing the axial-direction length of the insulating sheet 51, and reducing thus costs. This effect becomes more distinctive the greater the number of slots 38 that are formed in the stator core 28. In this case as well, the insulating paper 50 is positioned with respect to the stator core 28 upon insertion of the insulating paper 50 in the slots 38. Furthermore, shifting of the insulating paper 50 in the axial direction is suppressed through engagement of the leading end sections of the fold-back sections 57 with the end faces of the teeth 36.

Next, in step S14, the coil 30 is inserted into the slot 38. Specifically, the conductor segments 100 are inserted along the axial direction and are arranged on the inward side of the insulating paper 50 that is disposed in the slot 38. The leg sections 102, 104 of the conductor segments 100 and the conductor segments 100 are connected with each other. The coils 30 that include U phase coils, V phase coils and W phase coils are formed thereby.

In a subsequent step S16, the wedge member 70 is inserted into the slot 38. As illustrated in FIGS. 11 to 13, the wedge member 70 is fitted through insertion, from inward in the radial direction of the slot 38, through the opening 40.

In a subsequent step S18, the stator core 28 having the insulating paper 50, the coil 30 and the wedge member 70 assembled thereinto, is subjected to a heating treatment. The adhesive layer 84, which has for instance a thermoplastic resin, melts as a result, and a strong adhesive function thereof is brought out. In addition, the foam layer 82 expands by foaming up, as a result of which the insulating paper 50 is pushed against the coil wires 68 and the inner wall faces 381, 382, 383 of the slot 38, and is solidly bonded thereto. The coil 30 is firmly fixed to the stator core 28 as a result, by way of the insulating paper 50.

Manufacture of the stator 16 is complete as the coil 30 is thus fixed to the stator core 28 by the insulating paper 50.

The wedge member in the rotating electrical machine according to the invention is not limited to the one in the above-described embodiment, and may accommodate various improvements and modifications.

In the above-described embodiment, the protrusion 73 in the flat section 72 of the wedge member 70 has been explained as a protrusion that is formed curved convexly inward in the radial direction. The protrusion 73 may be formed, by contrast, curving convexly outward in the radial direction. Also in this case, the protrusion 73 functions as an elastic deformation section. By undergoing plastic deformation, the surface of the protrusion 73 is made flush with the surface of the flat section 72, and the coil is pressed toward the back of the slot. In this case, however, the protrusion need not undergo plastic deformation, and may retain its shape. In such a configuration as well the coil fixing force is maintained, since the pressing surface against the coil is secured by the flat section.

Figure 17:
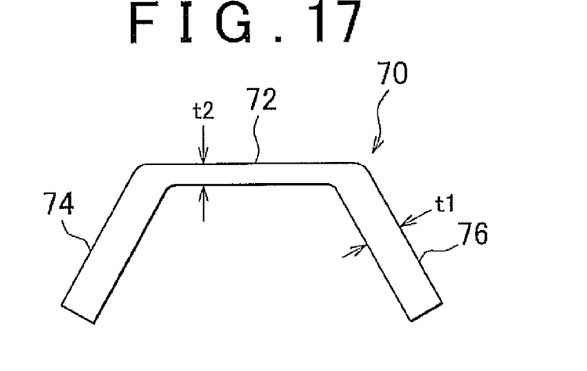
FIG. 17 is an end-face diagram illustrating a first variation of a wedge member.

In the above-described embodiment, an example has been explained wherein the protrusion 73 and the flat section 72 of the wedge member 70 are formed as one member, but the protrusion may be omitted, and the flat section 72 may be formed flat from the beginning and all over the surface, as illustrated in FIG. 17 (a first variation). The flat section 72 may have a substantially trapezoidal end face and cross section. In this case as well, similarly, the thickness t2 of the flat section 72 may be smaller than the thickness t1 of the engaging sections 74, 76. As a result, the flat section 72 undergoes plastic deformation more readily, when the wedge member 70 of this variation is inserted into the slot 38. The insertion operation of the wedge member 70 is therefore less likely to be difficult.

Figure 18:
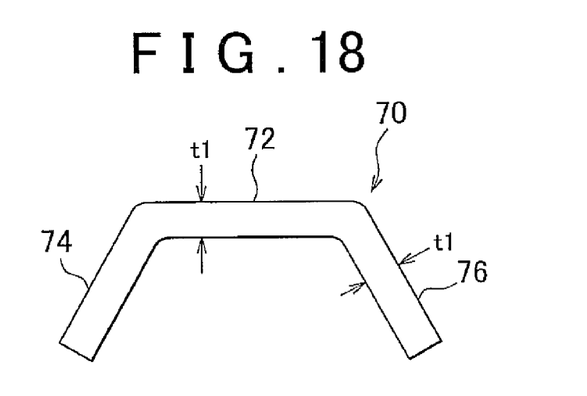
FIG. 18 is an end-face diagram illustrating a second variation of a wedge member.

In a second variation of the wedge member 70, illustrated in FIG. 18, the flat section 72 and the engaging sections 74, 76 may have a same thickness t1. The wedge member 70 has the same shape as the wedge member 70 illustrated in FIG. 17. In this case, the peripheral-direction width of the flat section 72 of the wedge member 70 may be slightly shorter than that of the flat section 72 illustrated in FIG. 17. As a result, the flat section 72 undergoes elastic deformation when the wedge member 70 is inserted into the slot 38. The engaging sections 74, 76 as well undergo elastic deformation so as to be curved. The peripheral-direction width of the wedge member 70 is reduced as a result, and hence the wedge member 70 can pass through the opening 40 of the slot 38.

Figure 19:
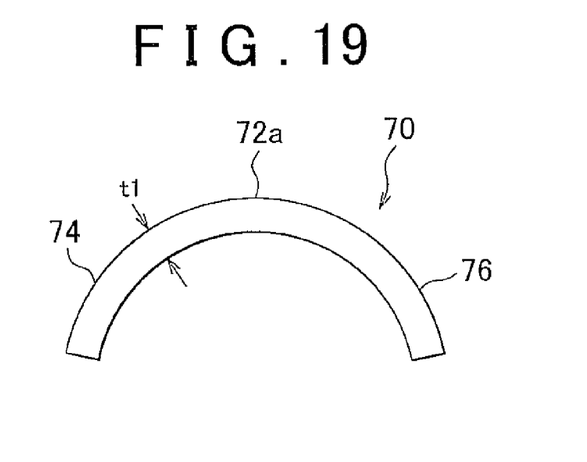
FIG. 19 is an end-face diagram illustrating yet a third variation of a wedge member.

In the above embodiments and variations, the wedge member 70 has been explained as a member that has a substantially U-shaped or trapezoidal end face and cross section. However, the structure of the wedge member is not limited thereto. An end face and a cross section of the wedge member may have some other shape, for instance a substantially V shape or substantially triangular shape (a third variation). Alternatively, the wedge member 70 may have a substantially arc-shaped end face and cross section, of a constant thickness t1, as illustrated in FIG. 19. In this case, the pressing section 72a and the engaging sections 74, 76 on both ends of the pressing section 72a, which press the coil by way of the insulating paper 50, are formed contiguously, without boundary lines therebetween. In the wedge member 70 of this variation, therefore, elastic deformation occurs in the pressing section 72a and the engaging sections 74, 76 upon insertion of the wedge member 70 into the slot 38. In this case as well, the thickness of the pressing section 72a may be smaller than the thickness of the locking sections 74, 76.

In the above embodiment, the insulating paper 50 is wrapped around the periphery of the coil 30, and the wedge member 70 presses the coil wires 68 via the overlap section 62 of the bent sections 58, 60 of the insulating paper 50. However, the insulating paper 50 may be omitted. In a case where no insulating paper is used, the coil and the wedge member may be assembled into the stator core. Then, the space between the slot inner wall face and the coil wires is impregnated with an insulating resin, such as a varnish or the like, that is then cured. Insulating performance between the stator core and the coil is secured also thereby.

What is claimed is:

1. A coil fixing member of a rotating electrical machine, wherein the rotating electrical machine includes a ring-shaped stator core, a slot formed at inner peripheral section of the stator core, a coil arranged in the slot, and wall sections defining opening on an inner periphery of the slot in a radial direction of the stator core, and wherein the coil fixing member is inserted into the slot, the coil fixing member comprising:
    a pressing section that presses the coil outward in the radial direction of the stator core, the pressing section has a flat section and a protrusion formed protruding outward in the radial direction of the stator core from the flat section; and
    engaging sections that are adjacent to both end sections of the pressing section in a peripheral direction of the stator core, that extend from the both end sections to an inward side in the radial direction of the stator core, and that include leading end sections respectively engaged with the wall sections.

2. The coil fixing member of the rotating electrical machine according to claim 1, wherein the engaging sections support the pressing section to press the coil outward in the radial direction of the stator core.

3. The coil fixing member of the rotating electrical machine according to claim 1, wherein the protrusion is formed at an intermediate position in the pressing section.

4. The coil fixing member of the rotating electrical machine according to claim 1, wherein the protrusion is a section that elastically deformed upon insertion of the coil fixing member into the slot.

5. The coil fixing member of the rotating electrical machine according to claim 4, wherein the protrusion is formed through curving of the pressing section.

6. The coil fixing member of the rotating electrical machine according to claim 1, wherein the flat section is formed substantially along a side face of a coil that is formed of a rectangular wire and is positioned at an innermost periphery in the slot.

7. The coil fixing member of the rotating electrical machine according to claim 6, wherein a thickness of flat section is identical to that of the engaging sections.

8. The coil fixing member of the rotating electrical machine according to claim 1, wherein the protrusion is thinner than the flat section.

9. The coil fixing member of the rotating electrical machine according to claim 1, wherein the protrusion is plastically deformed by being pushed against the coil, and a surface of the protrusion is made flush with a surface of the flat section.

10. The coil fixing member of the rotating electrical machine according to claim 1, wherein:
    the pressing section has a flat section; and
    the flat section is thinner than the engaging sections.

11. The coil fixing member of the rotating electrical machine according to claim 10, wherein the flat section is formed substantially along a side face of a coil that is formed of a rectangular wire and is positioned at an innermost periphery in the slot.

12. The coil fixing member of the rotating electrical machine according to claim 10, wherein the flat section is a section that elastically deformed upon insertion of the coil fixing member into the slot.

13. A rotating electrical machine, comprising:
    a rotor;
    a ring-shaped stator disposed around the rotor, the stator includes a stator core;
    a slot formed at inner peripheral section of the stator core;
    insulating paper that is inserted into the slot;
    a coil arranged in the slot so as to be insulated from the stator core by the insulating paper;
    wall sections defining an opening on an inner periphery of the slot in a radial direction of the stator core; and
    a coil fixing member that is inserted into the slot, the coil fixing member having a pressing section and engaging sections,
    the pressing section presses the coil outward in the radial direction of the stator core, the pressing section has a flat section and a protrusion formed protruding outward in the radial direction of the stator core from the flat section,
    the engaging section are adjacent to both end sections of the pressing section in a peripheral direction of the stator core, that extend from the both end sections to an inward side in the radial direction of the stator core, and that include leading end sections respectively engaged with the wall sections.

* * * * *